(No Model.)
J. H. CHEEVER.
COMPOSITION FOR STEAM PACKING.
No. 307,436. Patented Nov. 4, 1884.
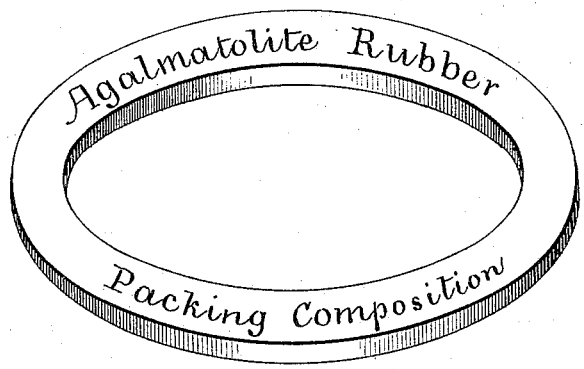
Witnesses:
E. E. Masson
Wm. N. Bates.
Inventor
John H. Cheever
by Chas. J. Hedrick
his attorney

UNITED STATES PATENT OFFICE.

JOHN H. CHEEVER, OF NEW YORK, N. Y.

COMPOSITION FOR STEAM-PACKING.

SPECIFICATION forming part of Letters Patent No. 307,436, dated November 4, 1884.

Application filed May 10, 1882. (No specimens.)

*To all whom it may concern:*

Be it known that I, JOHN H. CHEEVER, a citizen of the United States, residing at New York, in the county of New York and State of New York, have invented certain new and useful Improvements in Compositions or Compounds for Steam-Packing, Gaskets, Valves, and other Like Purposes; and I do hereby declare the following to be a full, clear, and exact description of the invention, such as will enable others skilled in the art to which it appertains to make and use the same.

In the accompanying drawing a packing-ring is shown in perspective.

This invention consists, principally, in the combination or admixture, with the other ingredients in rubber compounds for steam-packing and similar purposes, of the mineral called "agalmatolite" or "pagodite," which, so far as I am aware, is a new ingredient in such compounds. Agalmatolite or pagodite is related to soapstone, but is harder and denser than that mineral, and differs also from it in chemical constitution. It has an amorphous compact texture, and is very free from grit. In its natural state (in which I prefer to use it) it contains sufficient silica to give it the formula of a bisilicate, or nearly so. In use it gives body and resisting qualities to the packing composition of which it forms part. A very large proportion of it may be used. The packing compositions containing it are excellent, being very smooth and homogeneous throughout, making a tight joint, and having great resistance and durability, while at the same time they are inexpensive.

To prepare an agalmatolite composition in the best way to me known, I take of dried and masticated india-rubber ten pounds, and incorporate with it, by means of the mullers or mills in common use for working caoutchouc, a mixture consisting of twenty-one pounds of agalmatolite or pagodite, fifteen pounds of graphite or plumbago, and one pound of sulphur. When the mixture is complete, the mass is removed to the spreaders or calender and formed into a sheet of any required thickness, ready for cutting into the various forms and dimensions of surface necessary for its use, as packing, gaskets, valves, and other like purposes for steam-fittings and gas apparatus, ready to be vulcanized or not, in use, depending upon the conditions of its place. In cases where corrosive gases or liquids come in contact with the compound a proportion of gutta-percha is added, which is varied from ten to twenty-five per cent. of the india-rubber.

Instead of plumbago, soapstone may be used.

I do not claim, broadly, vulcanizable compounds in packing and the like, as they are well known.

For some purposes the composition may be sold in bulk. It is evident, also, that gaskets and other articles can be made of the composition and sold.

I claim—

1. A packing composition of which the essential ingredients are agalmatolite and rubber, substantially as described.

2. A composition for packing and other purposes, composed of rubber, sulphur, agalmatolite, and plumbago or its specified substitute, substantially as described.

3. A packing composition of which the essential ingredients are gutta-percha, rubber, and agalmatolite, substantially as described.

In testimony whereof I affix my signature in presence of two witnesses.

JOHN H. CHEEVER.

Witnesses:
 WILLARD L. CANDEE,
 J. D. CHEEVER.